United States Patent Office 3,654,229
Patented Apr. 4, 1972

3,654,229
BAKING ENAMEL VEHICLE COMPRISING THE REACTION PRODUCT OF AN OXAZOLINE WITH MELAMINE AND FORMALDEHYDE
Jerry Hoyt Hunsucker, Terre Haute, Ind., assignor to Commercial Solvents Corporation, New York, N.Y.
No Drawing. Filed May 12, 1970, Ser. No. 36,680
Int. Cl. C08g 9/24, 9/30
U.S. Cl. 260—67.6 R                    23 Claims

ABSTRACT OF THE DISCLOSURE

An improved vehicle for the formulation of baking enamels obtained by reacting an oxazoline with a member selected from the group consisting of formaldehyde, melamine, hexamethoxymethylmelamine, urea, urea-formaldehyde resin, dimethylolpropionic acid, and phenol or mixtures thereof.

BACKGROUND OF THE INVENTION

This invention relates to an improved vehicle for baking enamels. In a particular aspect, it relates to improved vehicles derived from oxazolines.

It is known from Purcell, U.S. Pat. 3,248,397, to prepare drying oils from 2-ethenyl oxazolines by copolymerizing them with olefinic or diolefinic monomers. These drying oils are useful as vehicles in protective coatings and finishes based on them have received wide acceptance. However, the protective coatings industry is ever in need of improved finishes, particularly baking enamels intended for use on steel. Particularly desirable are vehicles possessing corrosion resistance, good adhesion, hardness without loss of flexibility, and relatively colorless so as not to interfere with pigmentation of light-colored finishes.

A baking enamel is understood to be a partially polymerized resinous compound, usually dispersed in an organic solvent and formulated with pigments and other additives, which, when applied to a substratum and heated, polymerizes completely to form a tough, hard, adherent, flexible protective coating on the substratum.

SUMMARY OF THE INVENTION

It is an object of this invention to provide improved vehicles for baking enamels.

Another object of this invention is to provide baking enamels based upon oxazoline co-polymers and terpolymers.

Other objects of this invention will be apparent to those skilled in the art from the disclosure herein.

It is the discovery of the present invention to provide polymeric resinous compounds having especial utility as the vehicle in the formulation of baking enamels. The resins of the present invention are condensation products of an oxazoline compound corresponding to Formula I $$R-\underset{R^2}{\underset{|}{\overset{R^1}{\underset{|}{C}}}}-C\diagdown_{O-CH_2}^{\diagup N-\overset{R^4}{\underset{|}{C}}-R^3}$$
(I)

with a member selected from the group, herein designated as Group A, consisting of formaldehyde, melamine hexamethoxymethylmelamine, urea, urea-formaldehyde resin, phenol and 2,2-dimethylolpropionic acid, or mixtures thereof.

In the foregoing Formula I, R can be a saturated or unsaturated hydrocarbon radical of from 1 to 20 carbons or the group $$R^4-\underset{H_2C-O}{\underset{|}{\overset{R^3}{\underset{|}{C}}}-N}\diagdown_{C-CH_2-X-}^{\diagup R^1}\underset{R^5}{\underset{|}{R^2}}$$

wherein X is any divalent, or trivalent saturated or unsaturated aliphatic hydrocarbon group, including straight chain or branched chain, of from 1 to 32 carbon atoms; $R^1$ and $R^2$ are hydrogen or hydroxymethyl and can be the same; $R^3$ and $R^4$ can be methyl, ethyl, hydroxymethyl or the acyloxymethyl group $R°CH_2COOCH_2$— wherein $R°$ is a saturated or unsaturated aliphatic hydrocarbon radical and can be the same as R; $R^3$ and $R^4$ can be the same or different; when X is divalent, $R^5$ is hydrogen and when X is trivalent, $R^5$ is the group $$R^4-\underset{C-O}{\underset{|}{\overset{R^3}{\underset{|}{C}}}-N}\diagdown_{C-CH_2-Y-}^{\diagup R^1}$$

wherein Y is a saturated or unsaturated hydrocarbon radical of 16 carbon atoms.

DETAILED DISCUSSION

According to the present invention, there are provided new polymers and resins which, when incorporated in baking enamels, form hard, flexible, adherent films on a substratum, e.g. metals or textiles, after baking for a suitable period of time at a suitable baking temperature, e.g. about 20 minutes at 350° F. When the substratum is a textile, e.g. a natural fiber, a waterproof fabric is obtained.

Generally the invention contemplates resinous compounds denoted Compounds B, Compounds D and Compounds E.

Compounds B are resinous compounds obtained by reacting with a member of Group A, or mixture of members thereof, a oxazoline corresponding to the above Formula I wherein R is a saturated or unsaturated hydrocarbon radical of from 1 to 20 carbon atoms and $R^1$ and $R^2$ are hydrogen.

The oxazoline compounds useful in preparing the compound B correspond to the following Formula II, $$R-CH_2-C\diagdown_{O-CH_2}^{\diagup N-\overset{R^3}{\underset{|}{C}}-R^4}$$
(II)

where R is a saturated or unsaturated hydrocarbon radical of from 1 to 20 carbon atoms; $R^3$ and $R^4$ are methyl, ethyl, hydroxymethyl or the acyloxymethyl group $$RCH_2COOCH_2—$$

and can be the same or different. Some of these compounds are commercially available or they can be prepared by reacting an alkanolamine corresponding to Formula III,

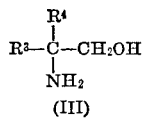

(III)

with a monocarboxylic acid corresponding to the formula $RCH_2COOH$ by known methods, e.g. by the method of Purcell, U.S. Pat. 3,336,145 which is incorporated herein by reference thereto. R has the same meaning described above; $R^3$ and $R^4$ can be methyl, ethyl or hydroxymethyl and can be the same or different. These alkanolamines include 2-amino-2-ethyl-1,3-propanediol (AEPD), 2-amino-2-methyl-1,3-propane-diol (AMPD), 2-amino-2-methyl-1-propanol (AMP), and tris(hydroxymethyl)aminomethane (TA).

The monocarboxylic acids suitable for forming the oxazoline compounds of Formula II include saturated and unsaturated fatty acids of from 2 to 22 carbon atoms; including mixtures thereof. Such acids are well-known in the art and include, but are not limited to, acetic propionic, decanoic, lauric, linoleic, linolenic, oleic, stearic, behenic, etc. They are commercially available and the usual commercial grades, including the crude materials, are suitable for preparing the oxazoline compounds used in the prepartion of Compounds B. When $R^3$ or $R^4$ (Formula III) or both are hydroxymethyl, and when it is preferred that $R^3$ and $R^4$ (Formula II) or both be acyloxymethyl, then sufficient acid is included to esterify the hydroxymethyl group or groups, as is known in the art.

Compounds B are prepared by reacting an oxazoline corresponding to the foregoing Formula II:

(a) With formaldehyde and melamine generally in a mole ratio of about 1:5:1 respectively, (b) With hexamethoxymethylmelamine generally in a mole ratio of about 2.5:1 respectively;

(c) With hexamethoxymethylmelamine and 2,2-dimethylolpropionic acid generally in a mole ratio of about 2:1:2 respectively.

The above ratios are not critical and can be varied within rather wide limits without departing from the concepts of the present invention. Generally, however, it is preferred that the amounts of reactants be within about ±20% of the ratios set forth above.

The reaction for preparing compounds B is conducted generally by dissolving the components in a suitable solvent, e.g. butanol, and heating at from about 90 to about 110° C. under reflux for about 120 minutes, after which time the solvent and water of reaction are removed by distillation. An acidic catalyst, many of which are known, e.g. p-toluene sulfonic acid, can be used when desired. Generally about 0.5% of catalyst based on the weight of reactants is sufficient.

Compounds D are resinous compounds obtained by reacting with a member of the Group A, or mixture of members thereof, an oxazoline compound corresponding to the above Formula I wherein $R^1$ and $R^2$ in the above formula are hydroxymethyl and R is a saturated or unsaturated hydrocarbon radical of 1–20 carbon atoms.

The oxazoline compounds useful in preparing the compounds D correspond to the Formula IV:

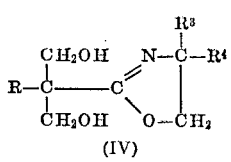

(IV)

wherein R is a saturated or unsaturated hydrocarbon radical of from 1 to 20 carbon atoms; $R^3$ and $R^4$ have the same meaning defined hereinbefore and can be the same or different. These compounds can be prepared from the oxazolines of the foregoing Formula II by reacting them with formaldehyde in about 1:2 mole ratio at a temperature below about 125° C., according to the method of H. L. Wehrmeister, U.S. Ser. No. 808,389, now U.S. Pat. 3,523,123, which is incorporated herein by reference thereto.

Compounds D are prepared by reacting an oxazoline corresponding to the foregoing Formula IV:

(a) With formaldehyde and melamine in a mole ratio of about 1:5:1 respectively, or (b) With the hexamethoxymethylmelamine and dimethylolpropionic acid in a weight ratio of about 3:3:1 respectively, or (c) With formaldehyde and urea in a mole ratio of about 1:3:1 respectively, or (d) With a butylated or iso-butylated urea-formaldehyde resin in a weight ratio of about 1:1 respectively, or (e) With the aforesaid urea-formaldehyde resin in a weight ratio of about 1:1 in the presence of dimethylolpropionic acid (DMPA) in a mole ratio of oxazoline to DMPA of about 1:1, or (f) With phenol preferably, but not necessarily, in the presence of an alkaline catalyst in a ratio of about 1:1–2, respectively, or (g) With phenol and formaldehyde, preferably in the presence of an alkaline catalyst in a mole ratio of about 1:4:1–2 respectively.

The reaction for preparing compounds D is conducted generally by the process set forth above for compounds B.

The above ratios are not critical and can be varied within rather wide limits without departing from the concepts of the present invention. Generally, however, it is preferred that the amounts of reactants be within about ±20% of the ratios set forth.

Compounds E are resinous compounds obtained by reacting with a member of the Group A compounds an oxazoline corresponding to the above Formula I where R corresponds to the group:

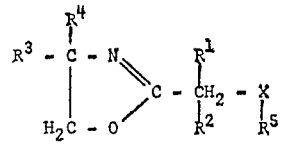

and $R^1$, $R^2$, $R^3$, $R^4$, $R^5$ and X have the definitions hereinbefore set forth.

The oxazoline compounds useful in preparing compounds E are bis-oxazoline and tris-oxazoline obtained by the method of A. W. Campbell et al., U.S. Pat. 3,415,520, which is incorporated herein by reference thereto. These compounds are derived by reacting an alkanolamine corresponding to the foregoing Formula III with a dicarboxylic acid of from 4 to about 36 carbon atoms or with a tri-carboxylic acid of up to about 54 carbon atoms, respectively. There are obtained compounds corresponding to Formula V where $a$ is 2 or 3 and $b$ is 1 or 0:

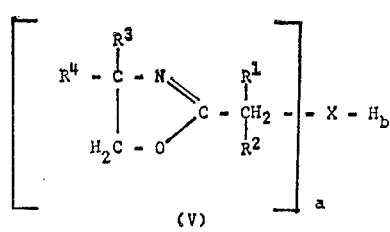

(V)

Dicarboxylic acids suitable for preparing the compounds of Formula V include, but are not limited to, acids of from 4 to 10 carbon atoms, viz., succinic, glutaric, adipic, pimelic, suberic, azelaic, and sebacic. Also the dimer of $C_{18}$ unsaturated fatty acids is a suitable and preferred dicarboxylic acid. Dimerized acids are known to those skilled in the art. They are described in, for example, Technical Bulletin No. 438C, published by Emery Industries, Inc., Cincinnati, Ohio.

The structure of dimer acid, shown schematically below, is essentially that of a long-chain dicarboxylic acid with two or more alkyl side chains ($R_6$ and $R_7$). It appears to contain at least one ethylenic bond. Also within the molecule is the linkage at Z resulting from the polymerization of the two unsaturated fatty acid molecules that form dimer acid. The exact nature of the linkage is undetermined. It may be as simple as a single carbon-to-carbon bond, or as complex as a cyclic-structure. The total number of carbon atoms is 36.

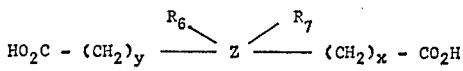

The tricarboxylic acids suitable for preparing the compounds of Formula V include the trimer of $C_{18}$ unsaturated fatty acids. This trimerized acid is known to those skilled in the art and is described in the aforementioned Technical No. 438C.

While not definitely established, the structure of trimer acid may be represented diagrammatically as shown below. It contains three or more alkyl side chains ($R_6$, $R_7$, $R_8$). Within the molecule, at W, are undetermined linkages resulting from the polymerization of the three unsaturated fatty acid molecules that form trimer acid. The total number of carbon atoms is 54.

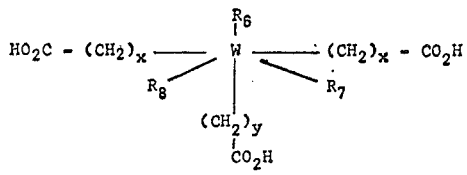

Compounds E are prepared by reacting a bis-oxazoline or a tris-oxazoline corresponding to Formula V:

(a) With a urea-formaldehyde resin in about a 2:1 weight ratio, when the oxazoline is a tris-oxazoline or about a 1:1.2 when the oxazoline is a bis-oxazoline, respectively, or (b) With hexamethoxymethylmelamine in about a 1:0.4 weight ratio, or (c) With phenol in about a 1:1—1.5 mole ratio (about 10:1 by wt.).

The above ratios are not critical and can be varied within rather wide limits without departing from the concepts of the present invention. Generally, however, it is preferred that the amounts of reactants be within about ±20% of the ratios set forth.

The formaldehyde used in the present invention can be the 37% or 44% by weight aqueous solutions of commerce, or it can be provided by paraformaldehyde. Also suitable are the alcoholic solutions of formaldehyde.

The hexamethoxymethylmelamine used in preparing the compounds of the present invention is commercially available either as liquid or solid and both materials are suitable. Also commercially available are phenol, urea and 2,2-dimethylolpropionic acid. The usual commercial grades are suitable. Urea-formaldehyde suitable for the practice of this invention is commercially availably and any of the usually commercial grades are satisfactory for use in the present invention. Butylated or di-butylated urea-formaldehyde, which on heating forms an irreversible bond, is preferred. The methylated or propylated products are also suitable.

The foregoing will be better understood with reference to the following examples. It is understood that the example are presented for the purpose of illustration only, and it is not intended to be limited thereby.

PREPARATION AND PROPERTIES OF COMPOUNDS B

Example 1

The following ingredients were charged to a distillation kettle:

|  | G. |
|---|---|
| Melamine (0.48 mole) | 60 |
| Formaldehyde (203 g. of a 37% solution, 2.5 mole) | 75 |
| 2-ethyl-4-ethyl-4 - propionyloxymethyl - 2 - oxazoline (0.5 mole) | 112 |
| Butanol | 111 |

The reactants were heated to reflux (about 94° C.) and maintained at that temperature for about 2 hours. Water and some butanol, as the azeotrope, 55 ml., were then removed by distillation and the reaction was again held under reflux for 15 minutes. Sufficient methanol was added to adjust the solids content to 80% by weight and the system was cooled. The properties of the solution are given in Table 1.

A wet film of 1.5 mil thickness was drawn down on a steel panel with a drawn-down bar, then baked for 20 minutes at 350° F. The film had a pencil hardness of 6H and an impact resistance of 10 lb.

Example 2

The following ingredients were charged to a distillation kettle and a reaction was carried out according to the general procedure of Example 1:

|  | G. |
|---|---|
| Hexamethoxymethylmelamine (0.286 mole) | 91 |
| 2-ethyl-4-ethyl-4-propionyloxymethyl - 2 - oxazoline (0.74 mole) | 159 |
| p-Toluene sulfonic acid (catalyst) | 1 |

The materials were heated to 150° C.–160° C. with stirring and water of reaction was separated by distillation. Heating was maintained until the reaction product had a viscosity of $Z_4$–$Z_5$. A 40% solution in ethoxy ethyl acetate was prepared for baking on steel. The properties of the resulting solution are given in Table 1. After baking 20 minutes at 350° F. the film had a pencil hardness of 3H+ and a reverse impact of 80 lb.

TABLE 1.—PROPERTIES OF COMPOUNDS B, POLYMER SOLUTIONS

| Ex. No. | Color[1] | Viscosity[1] | Solvent | Solids content, percent |
|---|---|---|---|---|
| 1 | 1 | $Z$–$Z_1$ | Methanol | 80 |
| 2 | 3 | B | Ethoxy ethyl acetate | 40 |
| 3 | 12 | M–N | Ethoxyethanol | 50 |

[1] Gardner.

Example 3

An oxazoline corresponding to Formula II was prepared from mixed fatty acids by charging 280° g. of tall oil fatty acids and 119 g. of 2-amino-2-ethyl-1,3-propanediol to a flask equipped with a stirrer, a reflux condenser and a take-off head. The mixture was heated to about 180° C. until the acid value was about 5. The total reaction time was about 4 hours. There was obtained an impure 2-hydrocarbo-4-ethyl-4-hydroxymethyl-2-oxazoline wherein the hydrocarbo group was mixed $C_{17}$ saturated and unsaturated aliphatic hydrocarbon groups. The product was used without further purification.

The following ingredients were charged to a distillation kettle and a reaction was carried out according to the general procedure of Example 1.

|  | G. |
|---|---|
| 2-$C_{17}$-4-ethyl-4-hydroxymethyl - 2 - oxazoline (about 0.2 mole) | 72 |
| Dimethylolpropionic acid (0.2 mole) | 26.8 |
| Hexamethoxymethylmelamine (0.65 mole) | 39.0 |

The reactants were mixed, then heated slowly to about 140° C. and 5 ml. of methanol was removed by distillation to produce a polymer with an acid value of 37.36. It was then diluted to 50% with ethoxy ethanol. The properties of the resulting solution are given in Table 1.

Example 4

The experiment of Example 1 is repeated in all essential dtails except that 0.5 mole of a 4,4-bis-acyloxymethyl oxazoline prepared from behenic acid and tris(hydroxymethyl)aminomethane in a 3:1 mole ratio is substituted for the oxazoline of Example 1. The resulting polymeric material is suitable for use as a vehicle for baking enamel.

Example 5

The experiment of Example 1 is repeated in all essential details except 0.5 mole of a 4,4-bis(hydroxymethyl) oxazoline prepared from oleic acid and tris(hydroxymethyl)aminomethane in about a 1:1 mole ratio is substituted for the oxazoline of Example 1.

PREPARATION AND PROPERTIES OF COMPOUNDS D

Example 6

The following ingredients were charged to a distillation kettle equipped with a stirrer, a reflux condenser and a take-off head:

|  | G. |
|---|---|
| Melamine (0.48 mole) | 60 |
| Formaldehyde (203 g. of 37% solution, 2.5 moles) | 75 |
| 2-[1,1 - bis(hydroxymethyl)ethyl] - 4 - ethyl-4-propionyloxymethyl-2-oxazoline (0.5 mole) | 136.5 |
| Butanol | 111 |

The reactants were mixed and heated with stirring to reflux temperature (about 95° C.) and held under reflux for 2 hours. During this time water from the formaldehyde and the water of reaction and some butanol were removed as the azeotrope (a total of 125 g. was removed over a period of about 50 minutes). The reaction product was then diluted to 80% by weight with methanol. The properties of the solution are given in Table 1. A 1.5 mil thickness (wet) was drawn down on a steel panel with a draw-down bar, then baked for 20 minutes at 350° F. The dried film was clear and colorless. The properties are given in Table 2.

Example 7

The experiment of Example 6 was repeated in all essential details except that the solvent was omitted and the following materials were used:

|  | G. |
|---|---|
| Urea (0.5 mole) | 30 |
| Formaldehyde (121.5 g. of 37% solution, 1.5 moles) | 45 |
| 2-[1,1-bis(hydroxymethyl)ethyl] - 4 - ethyl-4-propionyloxymethyl-2-oxazoline (0.5 mole) | 136.5 |

The reactants were mixed and slowly heated to reflux with stirring, (about 35 minutes). The temperature was maintained at reflux (about 100° C.) for about 2 hours, then water was separated from the reaction mixture by distillation, resulting in final temperature of about 120±° C. as 66 ml. of water were removed. The reaction mixture was diluted to 80% solids with methanol and the properties of the solution were determined (Table 2). A 1.5 ml wet film was drawn down on a steel panel and baked for 20 minutes at 350° F., giving a clear film. The properties are given in Table 3.

TABLE 2.—PROPERTIES OF COMPOUNDS D, POLYMER SOLUTIONS

| Ex. No. | Color[1] | Viscosity[1] | Solvent | Solids content, percent |
|---|---|---|---|---|
| 6 | 3 | M-N | Methanol | 80 |
| 7 | 5 | Y-Z | do | 80 |
| 8 | 5 | $Z_5$-$Z_6$ | do | 100 |
| 9 | 4 | D | Ethoxyethanol | 60 |
| 10 | 5 | X-Y | do | 66 |
| 14 | 10 | V-W | Toluene | 40 |
| 15 | 12 | V | Methanol | 80 |
| 16 | 12 | A-5 | do | 50 |
| 17 | 10 | A-5 | do | 50 |
| 18 | 14 | X | do | 80 |
| 19 | 10 | F | do | 67.5 |
| 20 | 3 | G | Butanol | 80 |

[1] Gardner.

TABLE 3.—PROPERTIES OF COMPOUNDS D, BAKED FILMS

| Ex. No. | Pencil hardness[1] | Reverse impact, pounds |
|---|---|---|
| 6 | 6H | 10 |
| 7 | 6H | +80 |
| 8 |  | +40 |
| 9 | 5H | 60 |
| 10 | 4H | 80 |
| 14 | +4H | +80 |
| 15 | 4H | 10 |
| 16 | 4B |  |
| 17 | 6H |  |
| 18 |  |  |
| 19 | 6H | 80 |

[1] The order of increasing hardness is B, F, HB, H, 3H, 4H, etc.

Examples 8-10

Following the general procedure of Example 6, the oxazoline of Example 6 was used to prepare additional resins. In Examples 8 and 9, the oxazoline was reacted with a butylated-urea resin (Beetle 1032 marketed by American Cyanamid Co.). In Example 9, there was included 2,2-dimethylolpropionic acid (DMPA) and 0.1 g. hydrochloride of 2-amino-2-ethyl-1,3-propanediol catalyst. The resin of Example 10 is similar to that of Example 9 except that the butylated urea resin was replaced with hexamethoxymethylmelamine. Further details are listed in Table 4. The properties of the resin solutions obtained therefrom are given in Table 2. A 1.5 mil wet film was drawn down on steel and baked at 350° F. for the times shown in Table 4. The baked films were colorless and showed good solvent resistance. Additional properties are given in Table 3.

TABLE 4

| Ex. No. | 8 | 9 | 10 |
|---|---|---|---|
| Oxazoline, grams | 54.6 | 54.6 | 91 |
| Oxazoline, moles | 0.2 | 0.2 | 0.33 |
| Butylated urea, grams | 45.6 | 45.6 | None |
| DMPA, grams | None | 26.8 | 44.6 |
| DMPA, moles | None | 0.2 | 0.33 |
| Catalyst, grams | None | 0.1 | None |
| Hexamethoxymethyl-melamine, grams | None | None | 39 |
| Hexamethoxymethyl-melamine, moles | None | None | 0.123 |
| Reaction temperature, ° C | 150-160 | 130 | 105-110 |
| $H_2O$ removed, ml | 16 | [1] 7 | 4-5 |
| Reaction time, minutes | 40 |  |  |
| Film baked, minutes | 15 | 20 | 20 |

[1] Includes butanol.

Example 11

The experiment of Example 6 is repeated in all essential details except that 0.5 mole of 2-[1,1-bis(hydroxymethyl)heptadecenyl]-4,4-hydroxymethyl - 2 - oxazoline is substituted for the oxazoline of Example 6. The resulting resinous compound has utility as a vehicle in baking enamels.

Example 12

The experiment of Example 8 is repeated in all essential details except that 0.5 mole of 2-[1,1-bis(hydroxymethyl)nonyl]-4-methyl - 4 - hydroxymethyl - 2 - oxazoline is substituted for the oxazoline of Example 8. The resulting resinous compound has utility as a vehicle in baking enamels.

Example 13

The experiment of Example 10 is repeated in all essential details except that 0.5 mole of 2-[1,1-bis(hydroxymethyl)undecenyl]-4,4-dodecenyloxymethyl - 2 - oxazoline is substituted for the oxazoline of Example 10. The resulting resinous compound is useful as a vehicle in baking enamels.

Example 14

A 2-[1,1-bis(hydroxymethyl) oxazoline diester (I) was prepared by reacting tris(hydroxymethyl)aminomethane, 1 mole, with 3 equivalents of tall oil fatty acids, then treating the oxazoline diester so formed with 2 moles of formaldehyde to form (I). This preparation is known in the art, as set forth hereinbefore. Phenol, 10.85 g., (about 1.15 mole) and I, 100 g. (about 1.05 mole) were mixed and heated to about 115° C. in about 15 minutes. The temperature was maintained at about 115° C. for about another 15 minutes and the product was allowed to cool. It was diluted to about 40% by weight with toluene. The properties of the solution are given in Table 2 and properties of the baked film are given in Table 3.

Examples 15–18

2 - [1,1 - bis(hydroxymethyl)ethyl]-4-ethyl-4-propionoxymethyl-2-oxazoline (II) was reacted with varying proportions of phenol and catalyst, both alkaline and acidic. The data are summarized in the following Table 5.

After preparation, the compounds were dissolved in methanol and the properties of the solution were determined (Table 2). A 1.5 mil wet film of each was drawn down on a steel panel and baked at 350° F. for 20 minutes. The properties of the film thereby obtained are given in Table 3.

TABLE 5

| Ex. No. | Oxazoline Grams | Oxazoline Mole | Phenol Grams | Phenol Mole | Catalyst Grams | Catalyst Type |
|---|---|---|---|---|---|---|
| 15 | 54.6 | 0.2 | 18.8 | 0.2 | 2 | H$_3$PO$_4$* |
| 16 | 54.6 | 0.2 | 18.8 | 0.2 | 8 | KOH |
| 17 | 27.3 | 0.1 | 22.8 | 0.24 | 1.5 | NaOH |
| 18 | 54.6 | 0.2 | 37.6 | 0.4 | 2 | NaOH |

*85%.

In Example 15, the mixture was heated at 160° C. for about 2.5 hours; in Example 16, the mixture was heated at 160° C. until the reaction was determined to be complete; in Example 17, the mixture was heated at 155° C. for about 45 minutes; in Example 18, the mixture was heated at 150–160° C. for 2.5 hours and the resulting polymer provided a film having desirable characteristics when applied to a substratum and baked.

Example 19

The oxazoline of Example 15 (68 g., 0.25 mole) was reacted with 94 g. of phenol (1 mole) and 105 g. of 37% formaldehyde (1.3 mole) in the presence of 1.5 g. NaOH at 95° C. The mixture was held at this temperature under reflux for 1 hour. The water was then separated by distillation; the reaction mixture was dissolved in methanol and neutralized to pH 7. The properties of the solution are given in Table 2.

A 1.5 mil film was drawn down on a steel panel and baked 20 minutes at 350° F. The properties of the resulting coating are given in Table 3.

Example 20

A 2-[1,1-bis(hydroxymethyl)-hydrocarbo]-4,4-dimethyl-2-oxazoline was prepared from 2-amino-2-methyl-1-propanol mixed fatty acids and formaldehyde by known methods. The hydrocarbo group was provided by fatty acids derived from tallow, principally stearic acid. A 191 g. portion of this oxazoline was mixed with 60 g. of melamine, 203 g. of 37% aqueous formaldehyde and 115 g. of butanol. The mixture was heated at reflux for 2 hours and then the water and butanol were separated by azeotropic distillation. The resulting product was diluted with butanol to 80% by weight solids. The properties of the solution are given in Table 2.

PREPARATION AND PROPERTIES OF COMPOUNDS E

Example 21

A tris-oxazolinyl compound corresponding to Formula V was prepared by mixing 259 g., about 0.8 mole, of trimerized fatty acid (Empol 1040 manufactured by Emery Industries, Inc., was used) with 85.4 g., about 0.95 mole, of 2-amino-2-methyl-1-propanol. The mixture was then heated to 170–175° C. with stirring until the acid value was >10. Water of reaction was separated in the take-off head. The total reaction time was about 5 hours and the final acid value was 4.9.

A baking enamel was prepared using the following ingredients:

| | G. |
|---|---|
| Tris-oxazoline | 50 |
| Butylated urea resin | 25 |
| Ferric oxide pigment | 73.5 |
| Talc | 34.8 |
| Calcium carbonate | 34.8 |
| Xylene | 36.0 |
| p-Toluene sulfonic acid catalyst | 0.28 |
| 24% lead drier | .48 |
| 6% cobalt drier | .48 |

The above was drawn down on a steel panel and baked at 350° F. for 20 minutes. The properties are given in Table 6.

TABLE 6.—PROPERTIES OF COMPOUNDS E, BAKED FILMS

| Ex. No. | Pencil hardness [1] | Reverse impact, pounds |
|---|---|---|
| 21 | HB | 80 |
| 22 | 4H | 80 |
| 23 | 4H | +80 |
| 24 | 6H | 30 |
| 25 | B | 80 |
| 26 | 3H | 70 |
| 27 | 5H | 80 |
| 28 | H | 80 |
| 36 | F | +80 |

[1] See footnote at the bottom of Table 3.

Examples 22–23

A bis-oxazoline compound corresponding to Formula V was prepared by mixing 306 g., about 1 mole, of dimerized C$_{18}$ fatty acids with 119 g., 1 mole of 2-amino-2-ethyl-1,3-propanediol, heating to 180–185° C. with stirring until the acid value was less than 5. The resulting product had a color, Gardner, of 14, a viscosity at 100% by wt. of Z$_{9+}$, and an acid value of 3.2.

This oxazoline was incorporated into two baking enamel formulas, as given below, which were drawn down on standard Q steel panels at 1.5 mil and baked for 20 minutes, 350° F., to form in situ the resins which act as the binder in these formulations. The properties of the baked films are given in Table 6.

| Example | Grams of— 22 | Grams of— 23 |
|---|---|---|
| Oxazoline | 87.9 | 55.0 |
| Melamine | 34.2 | |
| Butylated urea resin | | 67.2 |
| Ferric oxide | 73.5 | 73.5 |
| Calcium carbonate | 34.8 | 34.8 |
| Talc | 34.8 | 34.8 |
| Xylene | 36 | 36.0 |
| p-Toluene sulfonic acid | 0.14 | 0.14 |
| 24% lead drier | 0.48 | 0.48 |
| 6% cobalt drier | 0.48 | 0.48 |

11
Example 24

A bis-oxazoline corresponding to Formula V was prepared by mixing 73 g. (0.5 mole) of adipic acid with 89.1 g. (1 mole) of 2-amino-2-methyl-1-propanol in a 3-necked flask equipped with a stirer, a reflux condenser and a thermometer. The temperature was gradually raised to 200° C. over a 4 hour period at which time the acid value was reduced to 6.8.

To 3 parts of the above bis-oxazoline, 2 parts of hexamethoxymethylmelamine were added and a trace of p-toluene sulfonic acid as a catalyst. A 1.5 mil draw down was made on a standard Q panel and the panel was baked at 350° F. for 20 minutes to form a hard, clear, solvent-resistant film. The properties of the film are given in Table 6.

Examples 25–26

A mixture of mono-oxazoline, bis-oxazoline and tris-oxazoline corresponding to Formula V were prepared by by mixing 153 g. (0.25 mole) of dimerized $C_{18}$ fatty acid (which consisted of 75% of the dimer, 22% of the trimer and 3% of monobasic acids) with 44.6 g. (0.5 mole) of 2-amino-2-methyl-1-propanol.

The reactants were mixed in a flask equipped with stirrer, thermometer and nitrogen sparge. The temperature was raised to 180–185° C. and maintained until the acid value was less than 10. The resulting oxazoline mixture was incorporated into two baking enamel formulas, as given below, which were then sprayed on standard Q steel panels at 1.5 mil thickness and baked at 350° F. for 20 minutes to form in situ the resins which act as the binders in these formulations. The properties of the baked films are given in Table 6. X-component in Example 25 was butylated urea formaldehyde and in Example 26, it was hexamethoxymethylmelamine.

|  | G. |
|---|---|
| Mixed oxazolines | 53.25 |
| X-component | 39.00 |
| Ferric oxide | 73.5 |
| Talc | 34.8 |
| Calcium carbonate | 34.8 |
| Xylene | 36.0 |
| p-Toluene sulfonic acid | 0.28 |
| 24% lead drier | 0.48 |
| 6% cobalt drier | 0.48 |

Examples 27–28

A tris-oxazoline corresponding to Formula V was prepared by mixing 119.1 g. (1 mole) of 2-amino-2-ethyl-1,3-propanediol with 259.3 g. of trimerized $C_{17}$ fatty acids (about 0.78 mole) and heating to 180–185° C. until the acid number was less than 5. The resulting product had a color of 8 and a viscosity, 100% of $Z_0$–$Z_7$.

The tris-oxazoline was incorporated into the following formulas and drawn down on standard Q panels at 1.5 mil thickness. The panels were then baked to form the in situ polymers which act as the binders for these formulations. The properties of the baked films are given in Table 6.

| Example | Grams of— | |
|---|---|---|
|  | 27 | 28 |
| Tris-oxazoline | 81.6 | 51.3 |
| Melamine | 41.7 |  |
| Butylated urea resin |  | 70.2 |
| Ferric oxide | 73.5 | 73.5 |
| Calcium carbonate | 34.8 | 34.8 |
| Talc | 34.8 | 34.8 |
| Xylene | 36.0 | 36.0 |
| p-Toluene sulfonic acid | 0.14 | 0.14 |
| 24% lead drier | .48 | .48 |
| 6% cobalt drier | .48 | .48 |

Example 29

The experiment of Example 24 is repeated except that TA, 1 mole, is substituted for AMP, and subenic acid, 0.5

12 mole, is substituted for adipic. The resinous compound so obtained has utility as a vehicle in a baking enamel.

Example 30

The experiment of Example 24 is repeated except that AMPD, 1 mole, is substituted for AMP, and sebacic acid, 1 mole, is substituted for adipic acid. The resinous compound so obtained has utility as a vehicle in a baking enamel.

Example 31

The experiment of Example 27 is repeated except that T, 1 mole, is substituted for AEPD and 0.33 mole of trimerized fatty acid is substituted for 0.78 mole. The resinous compound so obtained has utility as a vehicle in a baking enamel.

Example 32

The experiment of Example 31 is repeated except that 1 mole of trimerized fatty acid is substituted for 0.33 mole. The resinous compound so obtained has utility as a vehicle in a baking enamel

Example 33

The experiment of Example 27 is repeated except that 0.66 mole of trimerized fatty acid is substituted for 0.78 mole. The resinous compound so obtained has utility as a vehicle in a baking enamel.

Example 34

A bis-oxazoline corresponding to Formula V wherein $R^1$ and $R^2$ are hydroxymethyl was prepared by reacting 176 g. (about 0.25 mole) of the bis-oxazoline of 2-amino-2-ethyl-1,3-propanediol and dimerized $C_{18}$ fatty acids, prepared by known methods, with 33 g. (1 mole) of paraformaldehyde at 120° C. for 20 minutes and then at 150° C. for 30 minutes.

A 100 g. (0.13 mole) portion of the resulting tetrahydroxymethyl compound was reacted with 15 g. of phenol (0.17 mole) at 115° C. for 15 minutes. The reaction mixture was then cooled and diluted to 80% by weight solids with toluene. The viscosity of the solution was T and the color was 10.

A 1.5 mil wet film was drawn down on a steel panel and baked 20 minutes at 350° F. The resulting film had a pencil hardness of F and a reverse impact of 80 lbs.

I claim:

1. A resinous compound consisting of the condensation product of an oxazoline compound with a mixture of formaldehyde and melamine, or with hexamethoxymethylmelamine, or mixtures thereof with 2,2-dimethylolpropionic acid, said oxazoline compound corresponding to the formula

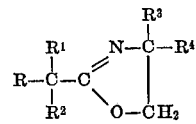

wherein R is a saturated or unsaturated hydrocarbon radical of from 1 to 20 carbons or the group

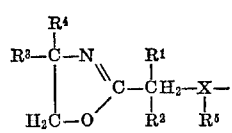

wherein X is any divalent, or trivalent saturated or unsaturated aliphatic hydrocarbon group of from 1 to 32 carbon atoms; $R^1$ and $R^2$ are hydrogen or hydroxymethyl; $R^3$ and $R^4$ are methyl, ethyl, hydroxymethyl or the group $R°CH_2COOCH_2$— wherein $R°$ is a saturated or unsaturated aliphatic hydrocarbon radical of from 1 to 20 carbon atoms; when X is divalent, $R^5$ is hydrogen; when X is trivalent, $R^5$ is the group

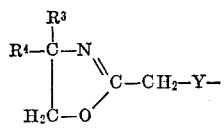

wherein Y is a saturated or unsaturated hydrocarbon radical of 16 carbon atoms.

2. A resinous compound consisting of the condensation product of an oxazoline compound with a mixture of formaldehyde and melamine, or with hexamethoxymethylmelamine, or mixtures thereof with 2,2-dimethylolpropionic acid said oxazoline compound corresponding to the formula

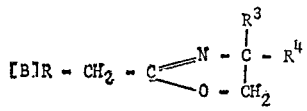

where R is a saturated or unsaturated hydrocarbon radical of from 1 to 20 carbon atoms; $R^3$ and $R^4$ are mtehyl, ethyl, hydroxymethyl or the acyloxymethyl group $RCH_2COOCH_2$—.

3. The compounds of claim 2 wherein $R^3$ and $R^4$ of said oxazoline compound are methyl groups.

4. The compounds of claim 2 wherein $R^3$ and $R^4$ of said oxazoline compound are hydroxymethyl groups.

5. The compounds of claim 2 wherein $R^3$ and $R^4$ of said oxazoline compound are represented by the formula $RCH_2COOCH_2$—.

6. The compounds of claim 2 wherein $R^3$ of said oxazoline compound is methyl or ethyl and $R^4$ is represented by the formula $RCH_2COOCH_2$—.

7. The resinous compounds of claim 2 obtained by condensing the said oxazoline compound with a mixture of formaldehyde and melamine.

8. The resinous compounds of claim 2 obtained by condensing the said oxazoline compound with hexamethoxymethylmelamine.

9. The resinous compounds of claim 2 obtained by condensing the said oxazoline compound with 2,2-dimethylolpropionic acid and hexamethoxymethylmelamine.

10. A resinous compound consisting of the condensation product of an oxazoline compound with formaldehyde and melamine, or hexamethoxymethylmelamine, or mixtures thereof with 2,2-dimethylolpropionic acid said oxazoline compound corresponding to the formula

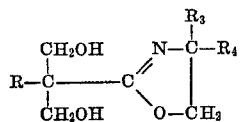

wherein R is a saturated or unsaturated hydrocarbon radical of from 1 to 20 carbon atoms; $R^3$ and $R^4$ are methyl, ethyl, hydroxymethyl or the acyloxymethyl group $RCH_2COOCH_2$—.

11. The compounds of claim 10 wherein $R^3$ and $R^4$ of said oxazoline compounds are methyl groups.

12. The compounds of claim 10 wherein $R^3$ and $R^4$ of said oxazoline compound are hydroxymethyl groups.

13. The compounds of claim 10 wherein $R^3$ and $R^4$ of said oxazoline compound are represented by the formula $RCH_2COOCH_2$—.

14. The compounds of claim 10 wherein $R^3$ of said oxazoline compound is methyl or ethyl and $R^4$ is represented by the formula $RCH_2COOCH_2$—.

15. The resinous compounds of claim 10 obtained by condensing the said oxazoline compound with a mixture of formaldehyde and melamine.

16. The resinous compounds of claim 10 obtained by condensing the said oxazoline compound with 2,2 - dimethylpropionic acid and hexamethoxymethylmelamine.

17. A resinous compound consisting of the condensation product of hexamethoxymethylmelamine with an oxazoline compound corresponding to the formula

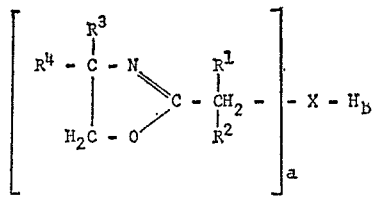

wherein $R^1$ and $R^2$ are hydrogen or hydroxymethyl; $R^3$ and $R^4$ are methyl, ethyl, hydroxymethyl or the group $R°CH_2COOCH_2$—; wherein $R°$ is a saturated or unsaturated aliphatic hydrocarbon radical of from 1 to 20 carbon atoms; X is any divalent, or trivalent saturated or unsaturated aliphatic hydrocarbon group, including straight chain or branched chain, of from 1 to 32 carbon atoms; when X is divalent, $a$ is 2, and $b$ is 1, and when X is trivalent, $a$ is 3, and $b$ is 0.

18. The compounds of claim 17 wherein $R^3$ and $R^4$ of said oxazoline compound are methyl groups.

19. The compounds of claim 17 wherein $R^3$ and $R^4$ of said oxazoline compound are hydroxymethyl groups.

20. The compounds of claim 17 wherein $R^1$ and $R^2$ are hydrogen.

21. The compounds of claim 17 wherein $R^1$ and $R^2$ are hydroxymethyl.

22. The compounds of claim 17 wherein X is divalent.

23. The compounds of claim 17 wherein X is trivalent.

References Cited

UNITED STATES PATENTS

| | | | | |
|---|---|---|---|---|
| 2,517,128 | 8/1950 | Meunier et al. | | 260—67.5 |
| 3,336,145 | 8/1967 | Purcell | | 106—195 X |
| 3,464,946 | 9/1969 | Downing | | 260—67.6 X |
| 3,523,123 | 8/1970 | Wehrmeister | | 260—307 |
| 3,563,920 | 2/1971 | Tomalia et al. | | 260—307 X |

HOWARD E. SCHAIN, Primary Examiner

U.S. Cl. X.R.

117—132 BF, 161 LN, 161 UN; 260—31.4 R, 33.4 R, 33.6 R, 47 CZ, 57 R, 67.5, 70, 70 A, 70 M, 307 F

PO-1050
(5/69)

UNITED STATES PATENT OFFICE
CERTIFICATE OF CORRECTION

Patent No. 3,654,229            Dated April 4, 1972

Inventor(s) Jerry H. Hunsucker

It is certified that error appears in the above-identified patent and that said Letters Patent are hereby corrected as shown below:

Column 2, line 45- "a" should be --an--
Column 4, line 55 - "3,415,520" should be --3,419,520--
Column 6, line 51 - following "impact" insert --resistance--
Column 6, line 66 - "280°g" should be --280g--
Column 11, line 5 - "stirer" should be --stirrer--
Column 11, line 19 - following "prepared" omit --by--
Column 13, line 23 - "mtehyl" should be --methyl--

Signed and sealed this 25th day of July 1972.

(SEAL)
Attest:

EDWARD M. FLETCHER, JR.        ROBERT GOTTSCHALK
Attesting Officer                Commissioner of Patents